Jan. 5, 1965     E. HUDZINSKI     3,164,373
SLACK MAKER APPARATUS FOR FACILITATING CABLE CONNECTIONS
Filed July 13, 1961
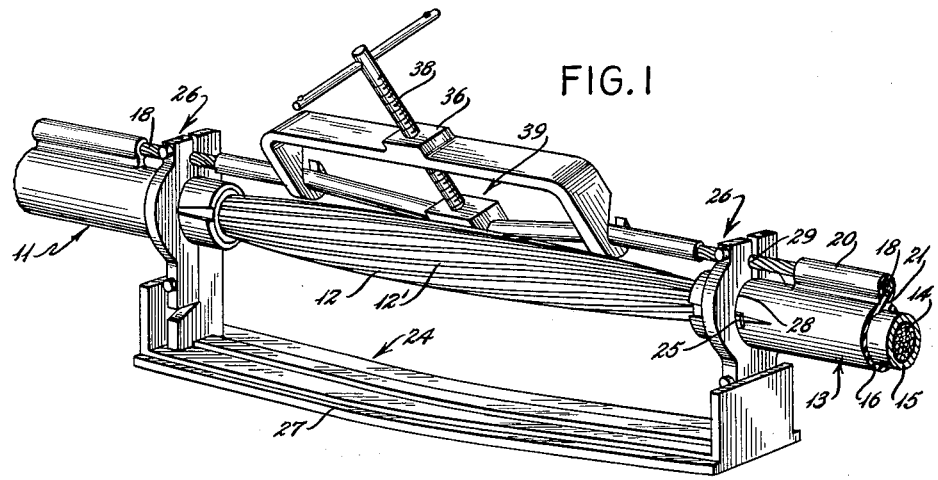
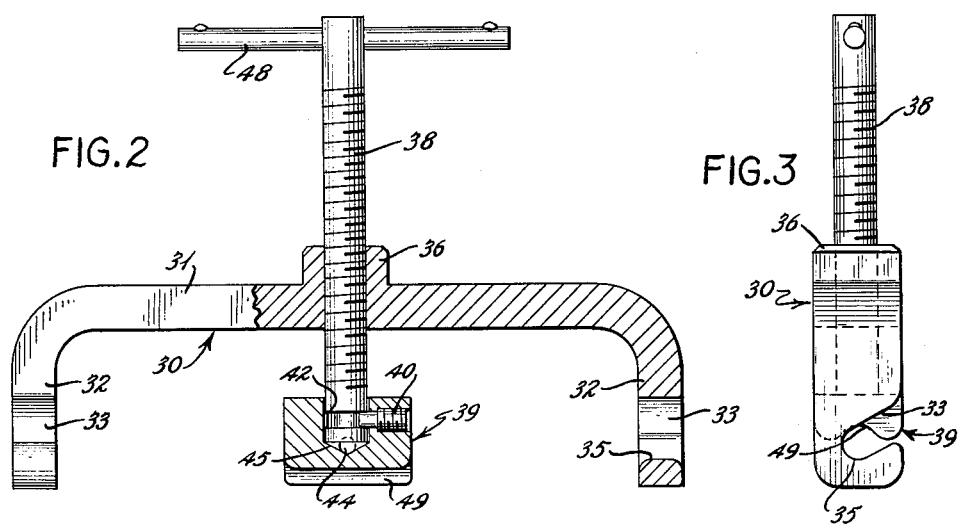
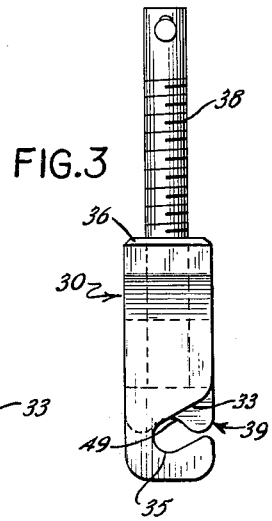
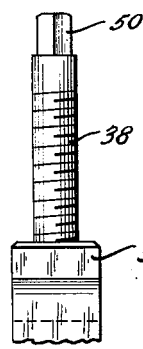
INVENTOR
EDWARD HUDZINSKI
BY
ATTORNEYS

United States Patent Office 3,164,373
Patented Jan. 5, 1965

3,164,373
SLACK MAKER APPARATUS FOR FACILITATING CABLE CONNECTIONS
Edward Hudzinski, Durham, N.C., assignor to Jameson Corporation, Charlotte, N.C.
Filed July 13, 1961, Ser. No. 123,836
1 Claim. (Cl. 254—67)

This invention relates to communication and more particularly to an apparatus and method by means of which the connecting of wires to multiconductor cables is facilitated. These may include conecting lead-in wires from terminal blocks as well as connections to branch cables or other bridged connections.

In the field of telephone communication multiconductor cables are supported on poles along rights of way and connections thereto are made to telephones of subscribers along the way. In order to support the multiconductor cable it has been the practice to use nonconducting cable to which the conducting cable is attached at spaced intervals, the weight of the two cables between the spaced poles resulting in substantial tension in the cables. In order to make a connection to the conductor cable it is necessary to remove the insulation or jacket from the cable, to identify the appropriate strands or cable pair desired, to remove the insultion from a portion thereof, and to splice the lead-in wires thereto. To accomplish this it is necessary to provide slack at the portion of the conductor cable to which the connection is made.

Recently a telephone wire has been introduced in which the multiconductor cable and the supporting or messenger cable are jacketed in a unitary covering described as a "Figure 8" and "Type IM," produced by General Cable Corporation and Superior Cable Company of Hickory, North Carolina, and other manufacturers.

Apparatus for producing slack in previous cable has been relatively complicated, weighty and difficult to use, especially at elevations above the ground at which telephone linemen work.

Accordingly, it is an object of the present invention to provide an apparatus and method especially adapted for use with "Figure 8" type cable for producing slack in telephone cable in order to facilitate connection of lead-ins from a drop line.

A further object is to provide an apparatus adapted to be applied to the supporting strand of the cable directly above the closure and between the bonding clamps of the cable terminal in order to produce slack in the cable and without obstructing the splicing operation.

A further object is to provide an apparatus for producing slack in a cable of the type in which the cable and its supporting strand are joined by an integral casing and which is relatively simple, durable and of light weight.

These and other objects of the invention will become apparent from the following description in conjunction with the accompanying drawing, in which:

FIG. 1 is a perspective of a device constructed in accordance with the present invention, illustrating its application to a telephone cable for the purpose of producing slack for the splicing operation;

FIG. 2, an elevation of the device to an enlarged scale, partly in section;

FIG. 3, a section on the line 3—3 of FIG. 2; and

FIG. 4, a fragmentary view to a reduced scale of a modified form.

Briefly stated, the invention includes a unitary U-shape yoke having aligned slots in its arm for receiving and holding portions of the supporting cable against movement away from the yoke, and a shaft in threaded engagement with the central portion of the yoke and having a freely rotatable shoe with messenger cable engaging surfaces at the outer end which may align with the cable engaging portions of the yoke, the other end of the shaft having means for rotating the same to urge the cable outwardly. Due to the unitary jacket about the conductor cable and supporting strand, upon the removal of the jacket from the conductor cable and the engagement of the device with the supporting strand and the application of force to produce a bight therein, there is simultaneously produced a slack portion in the oppositely disposed conductor cable, thus facilitating the splicing of a lead-in thereto.

With further reference to the drawing, there is illustrated an aerial telephone line which is carried by poles (not shown). The line includes a conductor cable 11 consisting of a multiplicity of conductors or strands 12, 12', etc., around which there is a protective covering 13, which may consist of a non-hygroscopic plastic 14 and aluminum foil 15 within a plastic jacket 16; parallel to the conductor cable is the supporting cable or messenger, which usually consists of a steel cable 18 enclosed by jacket 20 which is integrally joined to the jacket 16 of the conductor cable by a web portion 21.

The integral jacket or covering may be formed of a tough slightly resilient plastic such as high molecular weight polyethylene.

At intervals along the line it is necessary to connect one or more drop lines to the conductor cable. At such locations a cable terminal 24 is mounted on the line by end brackets or bonding clamps 26. The cable terminal has a central portion 27 on which the end brackets are mounted, and a housing is provided to protect the connection against weather and other matters. The brackets 26 have an enlarged opening 28 for receiving the conductor cable and a smaller opening 29 for engaging a short length of the supporting strand from which the jacket is removed. In mounting the cable terminal on the line it is necessary that the brackets be mounted sufficiently firm to prevent slipping along the line, due to expansion and contraction resulting from temperature changes, in order to avoid the possibility of the ends of the covering over the conductor cables and to ground the messenger cable to the aluminum shield. The latter may be accomplished by a member 25 extending through a split in the outer jacket.

The device of the present invention is applied to the supporting cable in order to produce slack in the conductor cable to facilitate connecting thereto. The device includes a U-shape yoke 30 having a central portion 31 and spaced arms 32. Each of the arms has a slot 33 which is inclined away from the end of the arm and has an arcuate seat 35 for receiving the supporting cable without injuring it.

At its central portion 36 the yoke is of increased thickness and threaded to engage a threaded shaft 38 which parallels the arms 32. At its lower end the shaft has a shoe 39 rotatably mounted thereon and retained in position by a set screw 40, whose end is received in a circumferential groove 42 on the shaft. In order to permit free rotation or swiveling of the shoe on the shaft during use, a thrust bearing member 44 is positioned in a recess 45 at the end of the shoe and against which the end of the shaft is engaged. The shoe 39 has a longitudinal arcuate slot 49 which receives the supporting cable when the device is applied as indicated in FIG. 1. In order that a bight may be formed in the cable without injury thereto, which could result from twisting, it is essential that the arcuate surfaces 35 of the yoke and 49 of the shoe be coaxial when the shaft is appropriately positioned.

At the other end the shaft receives a rod 48 by means of which the shaft may be turned. In the modification of FIG. 4, the end of the shaft has wrench receiving surfaces 50.

In the use of the device the jacket and protective covering are removed from the conductor cable for a short distance at the location for the connection, separating the unsheathed conductor cable from the oppositely disposed support cable. Then the bonding clamps of the cable terminal are customarily attached. The yoke is then engaged with the support cable at spaced portions intermediate the terminal clamps, with the shaft 38 being sufficiently retracted, after which the shaft is rotated to engage its shoe with and tighten and produce a bight in the messenger cable as indicated in FIG. 1. Such tightening, due to the unitary covering about the conductor and supporting cables, produces slack in the conductor cable. With such slack present, the lineman may more easily locate and make splices to the appropriate conductors 12, 12'. After the connections are completed, the shaft 38 is retracted, thus permitting the cables to resume their previous condition, and the tool is removed.

During the tightening of the device to produce slack the central portion 27 of the terminal connector will ordinarily bow outwardly, as is indicated in FIG. 1, the portion being flexible and returning to its previous condition after the tool is removed.

Accordingly, it will be understood that the invention contemplates in dual cables positioned within a unitary jacket and having a conductor cable from which the jacket is removed for the purpose of splicing leads the producing of slack in the conductor cable, by tightening the parallel cable, the apparatus including a U-shape yoke having spaced end portions for receiving and holding spaced portions of cable against movement away from the yoke, and a central shaft with a rotatably mounted shoe thereon having a cable receiving portion which may be aligned with those of the yoke and having means whereby the shaft may be rotated to urge the central portion of the cable outwardly from the yoke.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

Apparatus for application to a combination message transmission cable and a messenger cable for attaching wires to said message transmission cable comprising a terminal connector having spaced brackets for attachment in spaced location to said message transmission cable to which the wires are to be connected and an intermediate depending portion joining said spaced brackets, a cable tightening device for application to the messenger cable in generally parallel relation to said intermediate depending portion, said cable tightener comprising a yoke having spaced end portions and a central transversely threaded portion, said end portions having slots for the reception of said messenger cable, said slots being inclined toward the outer extremity of said end portions and having a curved inner portion for receiving said messenger cable and a threading shaft, the threads of which engage the threaded part of said central portion generally parallel to said end portions, a messenger cable engaging shoe rotatably mounted on the end of said threaded shaft between said end portions, said shoe having a concavity in alignment with said inner portion of said end portions of said yoke, an antifriction thrust bearing between said threaded shaft and said shoe, and means at the opposite end of said shaft by means of which the latter may be rotated.

References Cited by the Examiner

UNITED STATES PATENTS

| | | | |
|---|---|---|---|
| 960,291 | 1/10 | Egner et al. | 174—41 |
| 1,355,713 | 10/20 | Tench. | |
| 1,799,680 | 4/31 | Endsley. | |
| 1,822,407 | 9/31 | Kennedy. | |
| 1,879,334 | 9/32 | Kulp et al. | 29—259 |
| 2,136,238 | 11/38 | Engster | 174—40 |
| 2,344,052 | 3/44 | Neale | 254—67 |
| 2,509,929 | 5/50 | Kleinfelder et al. | 156—49 |
| 2,683,304 | 7/54 | Channell | 29—155.5 |
| 2,789,931 | 4/57 | Blue | 156—49 |
| 2,821,776 | 2/58 | Keister | 29—259 |
| 2,838,595 | 6/58 | Parkyn | 174—138 |

FOREIGN PATENTS 1,081,537  5/60  Germany.

WILLIAM FELDMAN, *Primary Examiner.*

JOHN F. CAMPBELL, *Examiner.*